(12) United States Patent
Morrow et al.

(10) Patent No.: US 9,953,327 B2
(45) Date of Patent: Apr. 24, 2018

(54) REAL TIME SERVICE ADVERTISEMENT FOR BILLING AND REVENUE SETTLEMENT IN A FEDERATED MODEL

(75) Inventors: Monique Morrow, Zurich (CH); Michael Hammer, Reston, VA (US); Masum Hasan, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 863 days.

(21) Appl. No.: 13/205,454

(22) Filed: Aug. 8, 2011

(65) Prior Publication Data
US 2013/0041728 A1 Feb. 14, 2013

(51) Int. Cl.
G06Q 30/00 (2012.01)
G06Q 30/02 (2012.01)

(52) U.S. Cl.
CPC ......... *G06Q 30/00* (2013.01); *G06Q 30/0206* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 6,553,346 B1* | 4/2003 | Walker et al. | 705/26.35 |
| 6,598,026 B1* | 7/2003 | Ojha et al. | 705/80 |
| 2002/0128934 A1* | 9/2002 | Shaer | 705/27 |
| 2004/0181457 A1* | 9/2004 | Biebesheimer et al. | 705/26 |
| 2005/0060229 A1* | 3/2005 | Riedl et al. | 705/14 |
| 2008/0195465 A1* | 8/2008 | Redmond et al. | 705/14 |

* cited by examiner

*Primary Examiner* — Michael W Schmucker
(74) *Attorney, Agent, or Firm* — Patterson + Sheridan, LLP (57) ABSTRACT

Techniques are described for fulfilling a request for services in a federated peering environment. Embodiments receive an advertisement of offered services from each of a plurality of service providers. Such an advertisement may specify a list of offered services and pricing information for the services. A request for one or more services is received from a client at a first service provider. Embodiments determine a second service provider from the plurality of service providers to peer with to dynamically create a federation of peers for fulfilling the service request, based on the received advertisements of offered services and the requested services. Embodiments then peer with at least the determined second service provider to dynamically create a peered federation and fulfill the service request through the created federation of peers.

24 Claims, 7 Drawing Sheets

REAL TIME SERVICE ADVERTISEMENT FOR BILLING AND REVENUE SETTLEMENT IN A FEDERATED MODEL

TECHNICAL FIELD

Embodiments presented in this disclosure generally relate to service provisioning and more particularly to a distributed model for service provisioning between federated peers.

BACKGROUND

A computer network is a geographically distributed collection of interconnected communication links and segments for transporting data between nodes (e.g., computers). Many types of network segments are available, with the types ranging from local area networks (LANs) to wide area networks (WANs). LANs typically connect personal computers and workstations over dedicated, private communications links located in the same general physical location, such as a building or a campus. WANs, on the other hand, typically connect large numbers of geographically dispersed nodes over long-distance communications links, such as common carrier lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP).

Computer networks may be further interconnected by an intermediate network node, such as a router, having a plurality of ports that may be coupled to the networks. To interconnect geographically dispersed computer networks and/or provide Internet connectivity, many organizations rely on the infrastructure and facilities of one or more Service Providers (SPs), such as an Internet service provider (ISP). ISPs typically manage backbone networks that are configured to provide high-speed connections to e.g., the Internet.

A client may enter into a service level agreement (SLA) with a SP in order to establish which services and what level of service are provided by the SP, as well as the price the client pays for each service. Often different SPs employ different pricing schemes for their services. For example, some SPs charge clients on a flat-rate basis where each client pays a fixed fee per billing period regardless of how much of the SP's service the client uses. Other SPs may charge clients using a tiered pricing scheme that is dependent upon the amount of the service utilized by the client.

At times, a client may request a service from a SP that the SP does not or cannot offer. For instance, a client could request a content caching service from a first SP that the first SP does not offer. For example, the first SP may not offer the content caching service because it does not have sufficient computing resources to offer the service, or the first SP may not offer the service because its computing resources are already occupied providing services for other clients. In such a situation, the first SP may negotiate an arrangement with a second SP capable of providing the content caching service to provide the client with the requested service. Currently, such a negotiation is a manual process which can take days or even weeks to complete. However, such a manual process may be unacceptable to a client who wishes to make use of the requested service within a shorter timeframe.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DESCRIPTION

Overview

One embodiment presented herein provides a method for dynamically peering with one or more service providers to fulfill a request for services. The method includes receiving, by a first service provider, a tagged advertisement of offered services from each of a plurality of service providers, wherein each tagged advertisement specifies at least one service offered by the respective service provider and pricing information for each of the offered services. Additionally, the request specifying one or more services to be provided is received at the first service provider from a client. The method further includes determining a second service provider, from the plurality, to peer with in order to fulfill the request. Such a determination is made based on the received tagged advertisements of offered services and the one or more services specified in the request. Also, the method includes peering with at least the second service provider to dynamically create a peered federation to fulfill the request. Furthermore, the method includes providing the requested services to the client through the peered federation.

Additional embodiments include software embodied in a computer readable medium storing a program configured to perform the aforementioned method, and a system having a processor and a memory storing a program configured to perform the aforementioned method.

Description of Example Embodiments

Generally, embodiments provide techniques for fulfilling a request for services in a federated peering environment. As used herein, a "service" refers to any hardware and/or software resource that may be provided by a service provider for a connection between two locations (e.g., a source location and a destination location). For example, a service provider could provide a content caching service for video conferencing between two sites of a particular enterprise. A service broker component receives an advertisement of offered services from a respective service advertisement component for each of a plurality of service providers. Such an advertisement may specify a list of services offered by of the service providers as well as pricing information about the services and metadata describing the services and the service provider. In one embodiment, this information is maintained in a service catalog. Generally, such a service catalog represents a data store containing information describing service providers and the services they provide. A service request specifying one or more services to be provided is then received from a client. The service broker component determines at least one service provider from the plurality of service providers to use in fulfilling the service request, based on the received advertisements of offered services as well as the services specified in the request. For instance, the service broker component may determine a number of candidate service providers that are capable of providing the requested service and then select one of the candidate service providers to provide the requested service. The service request is then fulfilled using the determined service provider(s). Advantageously, embodiments fulfill requests for services dynamically and in real time by using a distributed model for negotiating SLAs. Furthermore, such a distributed model may improve the reliability of the computing environment, as there is no centralized point of failure for the environment.

Figure 1:
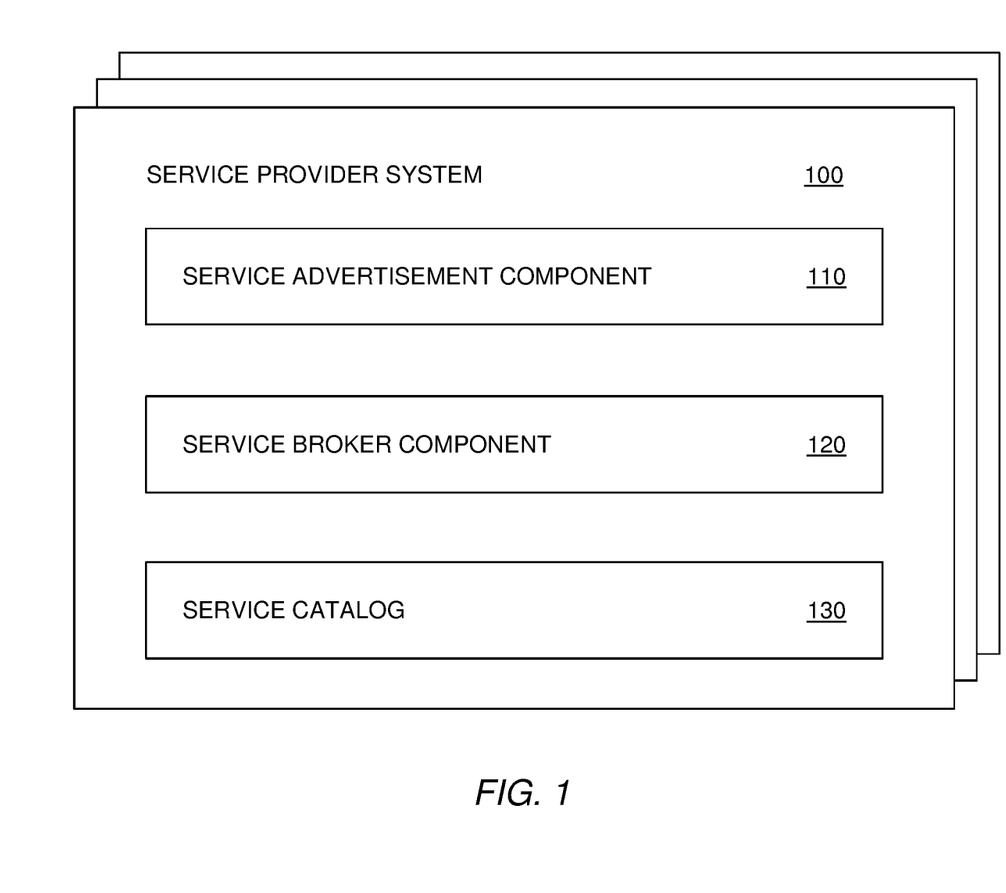
FIG. 1 is a block diagram illustrating a plurality of service provider systems, according to one embodiment presented in this disclosure.

FIG. 1 is a block diagram illustrating a plurality of service provider systems, according to one embodiment presented in this disclosure. Generally, each of the service provider systems 100 is associated with a respective service provider. Additionally, each service provider may offer one or more services. For instance, one service provider could offer video conferencing, while another could offer content caching services, while still a third could offer both. As shown, each service provider system includes a service advertisement component 110, a service broker component 120 and a service catalog 130. The service advertisement component 110 for a service provider system 100 is configured to transmit information regarding that service provider system 100 and services offered by that service provider to the other service provider systems. That is, rather than centralize the service provider information and logic for processing service license agreements, embodiments use a distributed model where the service providers exchange information amongst themselves and each service provider is configured with a service broker component capable of negotiating SLAs. Doing so advantageously avoids a centralized point of failure for the networked environment. In one embodiment, the service advertisement component 110 may be configured to initially transmit this service information to each of the other service provider systems and retransmit the information to the other service provider systems as needed. For instance, the service advertisement component 110 could be configured to retransmit the service information if the service offering for the corresponding service provider changes. In one embodiment, the service advertisement component 110 is configured to periodically transmit the service information to each of the other service provider systems.

The service broker component 120 is generally configured to receive service information from other service provider systems (e.g., from service advertisement components running on the other service provider systems) and to update the service catalog 130 with the received service information. The service catalog 130 represents a data store maintained by the service broker component 120 and which contains data and/or metadata describing the other service providers and the services they offer. The service catalog 130 may further contain information describing the service provider corresponding to the service provider system 100. In one embodiment, the service catalog 130 may be implemented using a database storing information regarding the service providers and the services they offer.

Additionally, the service broker component 120 is configured to receive service requests from clients and to determine one or more other service providers to use in fulfilling the request. For example, the service broker component 120 may receive a request for video conferencing services and may access the service catalog 130 to determine which of the other service providers offering such video conferencing services. The service broker component 120 may then select one of the determined service providers to provide the requested video conferencing service for the client. The service broker component 120 may further determine a network route between a source and a destination specified in the request that includes the selected service provider, which may include one or more other service providers. That is, as particular service providers may offer different services and/or combinations of services, the most direct route between the source and designation location associated with the request may not include service providers who offer one of the services specified in the request. As such, the service broker component 120 may be configured to adjust the route used to instantiate the request, so as to include one or more other service providers capable of providing the requested service.

Advantageously, embodiments provide a distributed model for dynamically processing service requests. While such service arrangements are currently negotiated manually by the client and the service providers, embodiments presented herein provide techniques for negotiating such service arrangements dynamically and in real time. Doing so enables these service arrangements to be negotiated more quickly and more efficiently. Additionally, by using a distributed model, embodiments provide a more reliable environment for negotiating service arrangements with no centralized point of failure.

Figure 2:
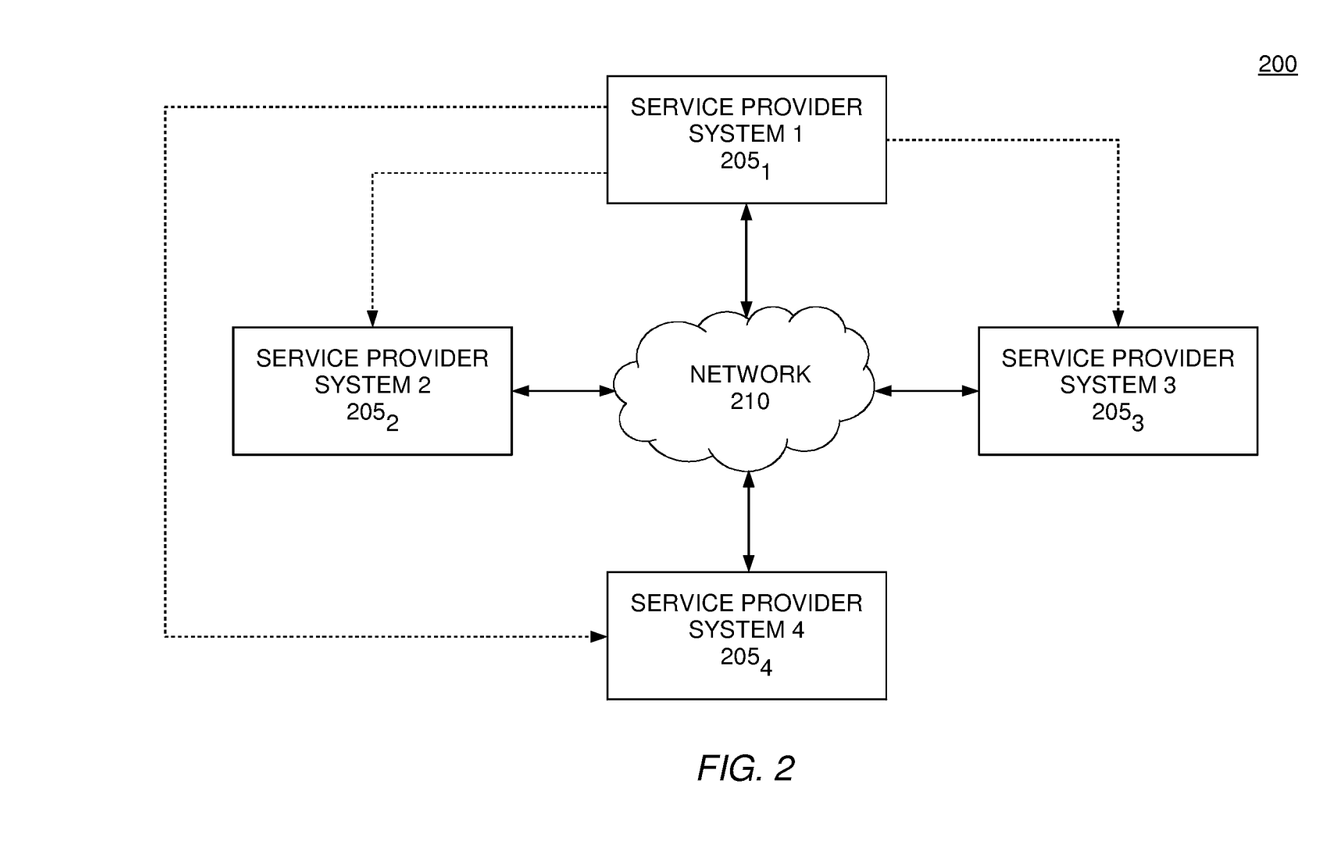
FIG. 2 is a block diagram illustrating a plurality of interconnected service provider systems, according to one embodiment presented in this disclosure.

FIG. 2 is a block diagram illustrating a plurality of interconnected service provider systems, according to one embodiment presented in this disclosure. As shown, the environment 200 contains a plurality of service provider systems 205 interconnected via a network 210, with each of the service provider systems 205 being associated with a respective service provider entity, each of which may offer one or more services. In the present example, the dashed lines show service provider system 1 205$_1$ advertising the service offerings of its corresponding service provider entity to the other service provider systems 205$_2$, 205$_3$ and 205$_4$. Such an advertisement may be transmitted to the other service provider systems 205$_2$, 205$_3$ and 205$_4$ using the network 210.

Additionally, the advertisement may include a listing of the services offered by the advertising service provider system 205 as well as information describing the service provider and each offered service. For instance, such information could include, without limitation, pricing information for the service (e.g., a fixed price for the service, a price per use of the service, an hourly price for the service, a periodic subscription rate for the service, etc.), quality information for the service (e.g., a maximum resolution supported for a video conferencing service), workload information for the service provider (e.g., network workload, processing workload, etc.), location information for the service provider (e.g., a geographic location of the service provider, a network location of the service provider, etc.)

and network quality information for the service provider (e.g., measurements of latency, loss, etc.).

Upon receiving the advertisement of service offerings from the service provider system 1 $205_1$, a respective service broker component 120 running on each of the service provider systems $205_2$, $205_3$ and $205_4$ may update a respective service catalog 130 to reflect the updated service offerings from service provider system 1 $205_1$. The service broker components 120 on the service provider systems $205_2$, $205_3$ and $205_4$ may then use their respective 130 updated service catalogs for determining which service providers to use in fulfilling service requests.

Figure 3:
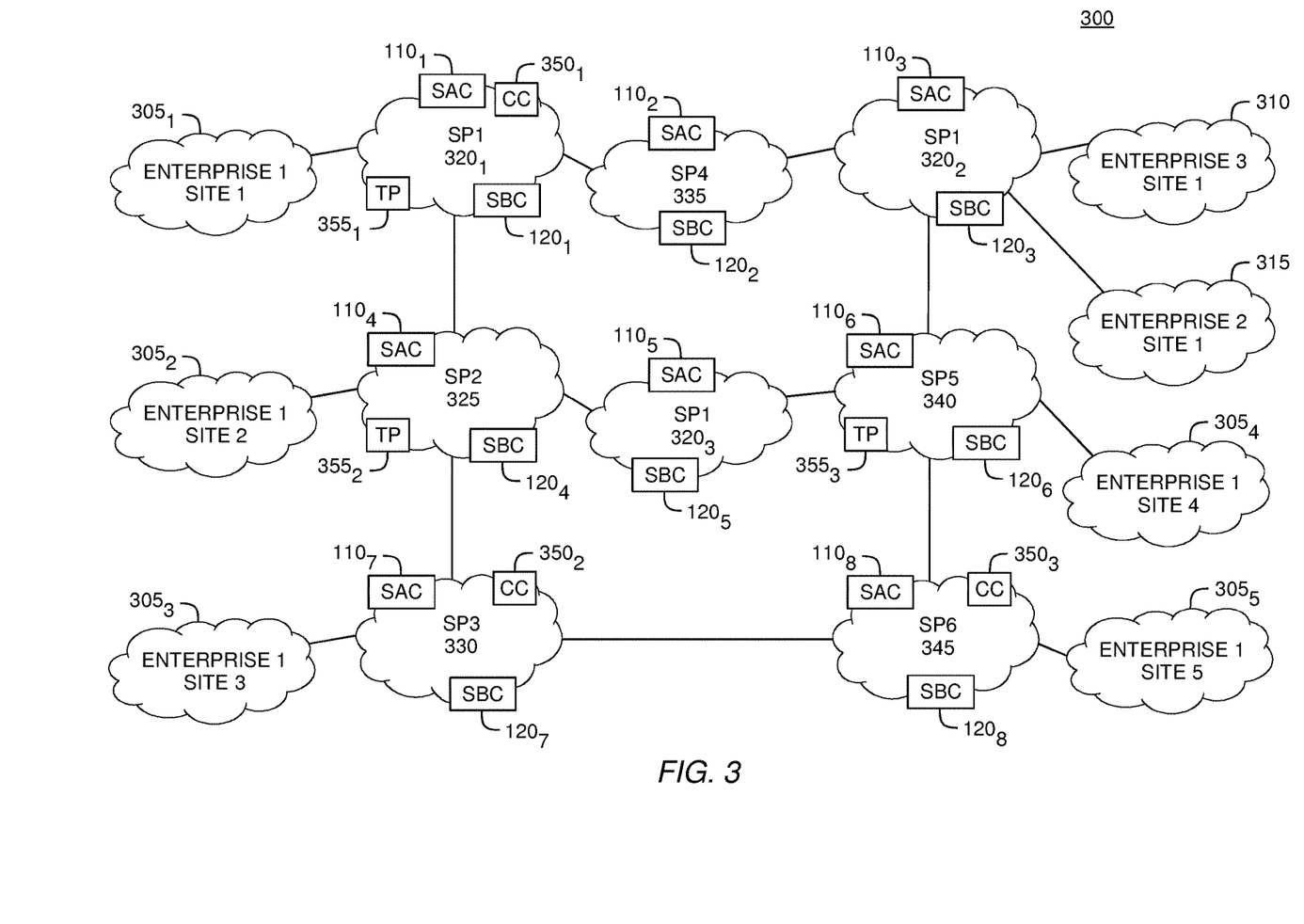
FIG. 3 is a diagram illustrating a network topology, according to one embodiment presented in this disclosure.

An example of fulfilling such a service request is now discussed with respect to FIG. 3, which illustrates a network topology according to one embodiment presented in this disclosure. As shown, the network environment 300 includes a plurality of service providers, including service provider 1 320, service provider 2 325, service provider 3 330, service provider 4 335, service provider 5 340 and service provider 6 345. Additionally, three enterprises are shown: enterprise 1 305, enterprise 2 315 and enterprise 3 310. Each service provider is configured with a respective service advertising component 110 and a respective service broker component 120. In this example a first set of service providers offer a content caching service 350 while a second set of service providers offer services 355 related to Cisco TelePresence®.

For instance, one such TelePresence-related service 355 is the Cisco TelePresence Multipoint Switch ("CTMS") that ideally is located near the geocentric midpoint between all the endpoints of a TelePresence conference. Generally, the CTMS determines which feeds related to the TelePresence conference should be routed to each party involved in the conference. That is, typically the numbers of microphones, speakers, cameras, video displays, auxiliary displays, etc. are more than one site can handle, meaning that the sum of all video/audio/data feeds coming from all endpoints cannot be output all at once at any one receiving site. As such, the CTMS may receive all the feeds from the various parties to the conference and send back to each site only those feeds it needs (i.e., only those feeds which it is capable of using). Furthermore, when legacy video-conferencing endpoints are involved, the CTMS may further convert audio and/or video feeds between legacy and TelePresence formats.

As an additional example of a TelePresence-related service 355, a service provider could (e.g., service provider 1 320) could provide call control and TelePresence management systems to help schedule and setup the calls between TelePresence endpoints. In addition to supporting the calls in progress, such a service could also track the availability and usage of specialized paths through the network to ensure the appropriate Quality of Service ("QoS") can be delivered for high-bandwidth TelePresence calls. Such a service could, for example, re-direct and re-constitute paths if error rates become too high.

As discussed above, the service advertisement component 110 for a given service provider may transmit service offering information to the other service providers (as well as receive the same information from the other service providers). The service broker components 120 use the received advertisement information to update a service catalog maintained at each of service provider. The service broker components 120 use the updated service catalogs to process service requests.

For the present example, assume that the service broker component $120_1$ at service provider 1 $320_1$ receives a service request requesting both Cisco TelePresence® and content caching services between enterprise 1, site 1 $305_1$ and enterprise 1, site 5 $305_5$. Once received, the service broker component $120_1$ may access a service catalog to determine which service providers between enterprise 1, site 1 $305_1$ and enterprise 1, site 5 $305_5$ should be used to provide the requested services. In addition, the service broker component $120_1$ may further determine a route between the service providers to use in fulfilling the request. That is, since not all the service providers 320 offer every service, the service broker component 1201 may determine which service providers should be used in fulfilling the request.

For example, the service broker component $120_1$ may access its service catalog 130 and determine that three candidate service providers are capable of offering the content caching service 350: SP1 $320_1$, SP3 330 and SP6 345. Upon determining the candidate service providers, the service broker component $120_1$ may select one of the candidate service providers to provide the content caching service 350. Such a determination may be based on a number of factors. For example, the service broker component $120_1$ could access its respective service catalog 130 and determine which of the candidate service providers provides the content caching service 350 for the lowest price. Additionally, the request may specify other service level requirements and/or factors for fulfilling the request. For instance, the request could specify that the content caching service 350 is to be used by enterprise 1, site 5 $305_5$. In such an example, the service broker component $120_1$ could select the candidate service provider in closest network proximity to enterprise 1, site 5 $350_5$ to provide the content caching service $350_5$. Thus, in the depicted example, the service broker component $120_1$ could select SP6 345 to provide the content caching service $350_3$, based on the proximity of SP6 345 to enterprise 1, site 5 $350_5$ where the content caching service $350_3$ will be used.

Continuing this example, the service broker component $120_1$ may also select a service provider to provide the requested TelePresence service. The service broker component $120_1$ may identify three candidate service providers capable of offering the TelePresence service 355: SP1 $320_1$, SP2 325 and SP5 340. The service broker component $120_1$ could then select one of these candidate service providers to provide the service 355 based on data and metadata describing each of the service providers in the service catalog 130 maintained by the service broker component $120_1$. For example, the service catalog 130 could specify that SP5 340 offers a dedicated 10 Mb/s connection for the TelePresence service $355_3$, while neither SP1 $320_1$ nor SP2 325 offers a dedicated connection for their respective services $355_1$ and $355_2$. As such, the service broker component $120_1$ could select SP5 340 to provide the requested TelePresence service 355, based on the service provider's 340 ability to provide a dedicated connection for the service.

In one embodiment, the service broker component $120_1$ considers a number of factors in selecting a service provider to provide the requested service. Such factors may include, without limitation, measurements of network workload, processing workload, network quality, geographic location, network location and service quality information for each of the candidate service providers capable of providing a requested service. The service broker component $120_1$ may then determine a measure of suitability for each of the service providers for providing the requested service based on the considered factors. For example, the service broker component $120_1$ could calculate a score for each of the factors and then calculate a weighted average of the scores.

The service broker component $120_1$ could then use the determined suitability to select the best suited service provider to provide the requested service.

In another embodiment, the service broker component $120_1$ determines multiple proposals for fulfilling the service request. In such an embodiment, each proposal could include different service providers and/or combinations of service providers for use in fulfilling the request. The proposals may then be submitted to the client from whom the service request was received. Additionally, the service broker component $120_1$ may determine a measure of suitability for each of the proposals and provide this suitability information to the client as well. Upon receiving a selection of one of the proposals from the client, the service broker component $120_1$ may fulfill the request based on the selected proposal. Doing so ensures that the service request is fulfilled in a manner that is satisfactory to the client.

Figure 4:
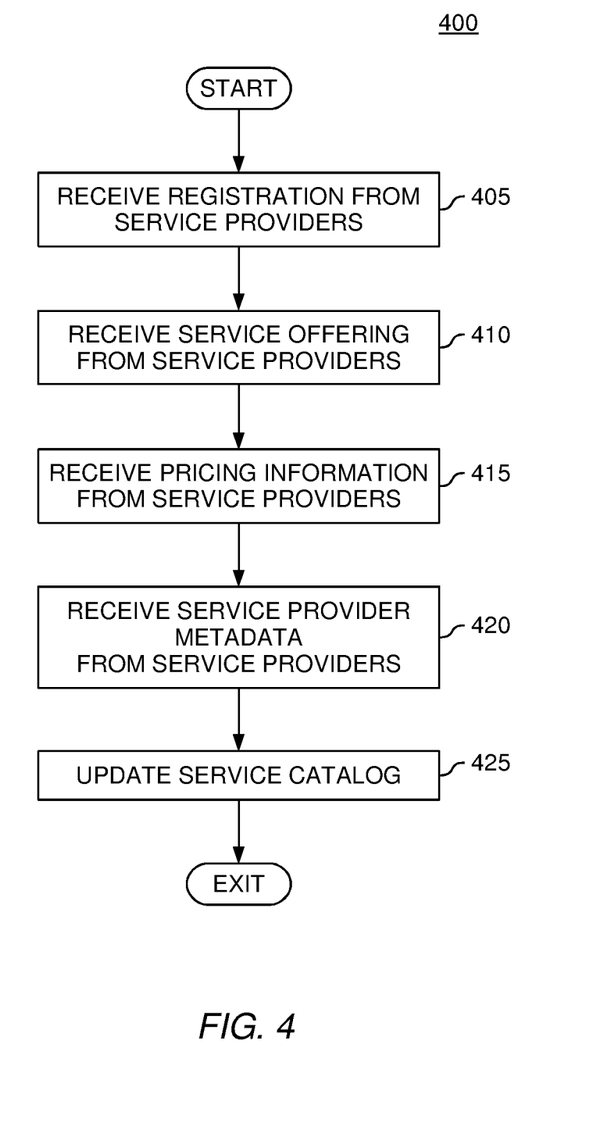
FIG. 4 is a flow diagram illustrating a method for updating a service catalog, according to one embodiment presented in this disclosure.

FIG. 4 is a flow diagram illustrating a method for updating a service catalog, according to one embodiment presented in this disclosure. As shown, the method 400 begins at step 405, where a service broker component 120 receives registration information from a plurality of service providers. For example, the registration information could be transmitted by a respective service advertisement component 110 running on a respective computer system managed by each of the service providers.

The service broker component 120 then receives service offering information from each of the service providers (step 410). Generally, the service offering information specifies which software and/or hardware services a service provider offers. The service broker component 120 further receives pricing information from each of the service providers (step 415). The pricing information generally specifies a price and/or pricing method for using each service. It is broadly contemplated that a number of different pricing methods may be used with various embodiments. Examples of such pricing methods include, without limitation, flat fee pricing (i.e., a fixed price per use of the service), hourly pricing (i.e., a price per hour of using the service), subscription-based pricing (e.g., a monthly fee for using the service), and so on. More generally, any pricing scheme consistent with the functions described herein may be used.

The service broker component 120 then receives service provider metadata from each of the service providers (step 420). Generally, the service provider metadata describes characteristics of the service provider and/or the services being provided. For instance, the service provider metadata could contain information on the geographic location of the service provider. This location information could be used when the service broker component 120 is processing a request for services, e.g., to determine which service providers are located in proximity to the requestor. In one embodiment, the service provider metadata indicates a current workload for the service provider. Such a workload may describe the network usage of the service provider and/or the processing usage of the service provider.

As another example, the service provider metadata could specify information about the quality of each service being provided by the service provider. For instance, the service provider metadata for a first service provider offering video conferencing services could specify that the first service provider has a dedicated 10 Mb/s connection for use by the service, while the service provider metadata for a second service provider offering the same service could specify that the second service provider only has a shared 10 Mb/s connection available for use by the service. The service broker component 120 could then use this information for selecting a service provider to use for the service. Continuing the example, assuming all other factors being equal, the service broker component 120 could determine that the first service provider should be used to provide the service because the first service provider is able to offer a dedicated connection for the service.

As yet another example, the service provider metadata could specify information describing the functionality of the service being provided by the service provider. For instance, for a video conferencing service, the service provider metadata could specify a maximum resolution of video streaming the service provider can support. Of course, these examples are for illustrative purposes and without limitation. Moreover, one of ordinary skill in the art will recognize that numerous other types of metadata describing the service provider and/or the services being provided may be used consistent with various embodiments. More generally, the service provider metadata broadly represents any data characterizing the service provider and/or services offered by the service provider.

Once the service provider metadata is received from each of the service providers, the service broker component 120 updates the service catalog based on the received information and the method 400 ends. Additionally, in an embodiment where the service catalog has not yet been created, the service broker component 120 could create the service catalog based on the received information. As discussed above, the service catalog represents a data store maintained by the service broker component 120 that contains data and/or metadata relating to the service providers and the services they offer. In one embodiment, the service catalog is a database that the service broker component 120 is configured to access and to maintain. Advantageously, maintaining such a service catalog enables the service broker component 120 to select service providers to fulfill a given service request. Furthermore, by creating and maintaining the service catalog using a distributed model, embodiments avoid the need for a centralized management system which can also become a centralized point of failure.

Figure 5:
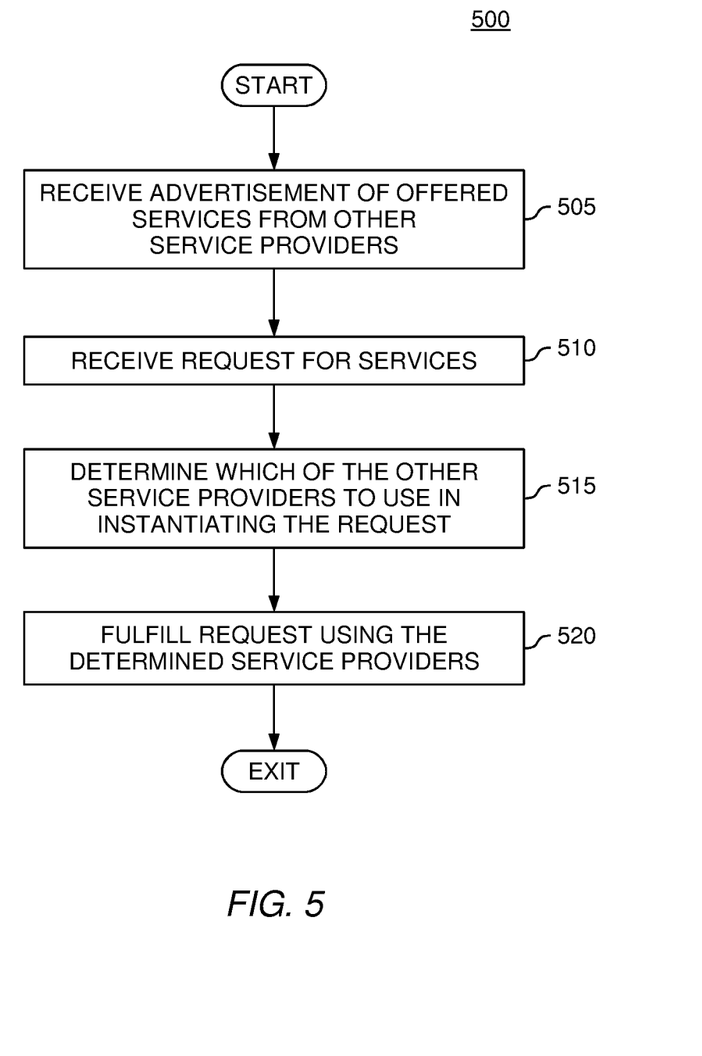
FIG. 5 is a flow diagram illustrating a method for fulfilling a service request, according to one embodiment presented in this disclosure.

Once the service broker component 120 creates and/or updates the service catalog, the service broker component 120 may then use the service catalog in fulfilling service requests from clients. FIG. 5 shows an example of this. More specifically, FIG. 5 illustrates a method for fulfilling a service request, according to one embodiment presented in this disclosure. As shown, the method 500 begins at step 505, where the service broker component 120 receives advertisement of offered services from each of a plurality of service providers. Generally, the advertisement of offered services may contain a listing of services offered as well as data and metadata describing the service provider and the offered services. Additionally, information contained in the advertisement of offered services could be used to create and/or update a service catalog. For instance, the method 400 shown in FIG. 4 and discussed above could be used in updating such a service catalog.

The service broker component 120 then receives a service request from a client (step 510). For instance, such a request could specify a number of services to be provided, as well as a source location and a destination location. As an example, a client could submit a service request to a service provider for video conferencing and content caching services from the client's site to a destination site. In one embodiment, the service request may specify one or more parameters for fulfilling the request. For instance, the request could specify a maximum price to be charged for a particular service. The service request may also specify quality requirements for a particular service. For instance, the service request could specify a minimum resolution for the video conferencing service. Additionally, the service request may contain requirements that service providers used in instantiating the request must fulfill. For instance, an exemplary service request could specify that the service provider used to provide the video conferencing service must provide a dedicated connection of at least a 10 Mb/s. As another example, a request could specify a maximum distance (e.g., a physical distance or a network distance) that the service providers may be located from the client location and/or the destination location in order to be eligible to fulfill the service request. Of course, these examples are without limitation and are provided for illustrative purposes only. More generally, any requirement for the service providers and/or the services being provided may be used.

Upon receiving the request, the service broker component 120 determines which service providers to use in fulfilling the request (step 515). For instance, the service broker component 120 could determine a number of candidate service providers which are capable of providing a requested service. The service broker component 120 may determine this based on both the services requested and any requirements specified in the service request. For example, for a service request for video conferencing services with a dedicated 10 Mb/s connection, the service broker component 120 may identify only the service providers who are capable of providing both the requested service and the dedicated connection.

The service broker component 120 could then select one of the candidate services providers to use in instantiating the requested service. Such a selection may be based on, for instance, information (e.g., stored in a service catalog) describing the service provider and the services the service provider offers. As an example, the service broker component 120 could maintain information on the geographic location of each candidate service provider and select the service provider closest to the client's location. As another example, the service broker component 120 could select the candidate service provider who offers the service at the lowest cost. In one embodiment, the service broker component 120 calculates a score for each of a number of different factors for each service provider. Illustrative factors include, without limitation, network distance, geographic distance, workload, latency, network quality (e.g., a measurement of packet loss) and so on. The service broker component 120 then generates a suitability value for each service provider based on the calculated scores. For instance, in one embodiment, the service broker component 120 generates the suitability value by calculating a weighted average of the calculated scores for the service provider. In such an embodiment, the service broker component 120 may weight some (or all) of the factors the same or may be configured to weight each factor differently. Furthermore, such weights may be pre-defined or may be explicitly specified by the user in the service request.

In one embodiment, the service broker component 120 is configured to generate a number of proposed plans for fulfilling the service request. Such proposed plans may specify different service providers and/or combinations of service providers to use in fulfilling the service request. The service broker component 120 could then provide the proposed plans to the client submitting the service request. Additionally, the service broker component 120 could provide information about each of the proposed plans to the client as well. Examples of such information include, without limitation, a price associated with each plan, a suitability value calculated for each plan and quality information associated with each plan (e.g., a maximum supported resolution for a video conferencing service, workload information for a service provider, etc.). The client may then select one of the proposed plans to use for fulfilling the service request.

One the service broker component 120 determines which service providers should be used, the service broker component 120 fulfills the request using the determined service providers (step 520) and the method 500 ends. Advantageously, the method 500 fulfills the service request in an intelligent way by selecting optimal service providers to use in fulfilling the request. Additionally, by using a distributed model for fulfilling the service request, the method 500 avoids any centralized point of failure for the computing environment, which may improve the reliability of the computing environment.

Figure 6:
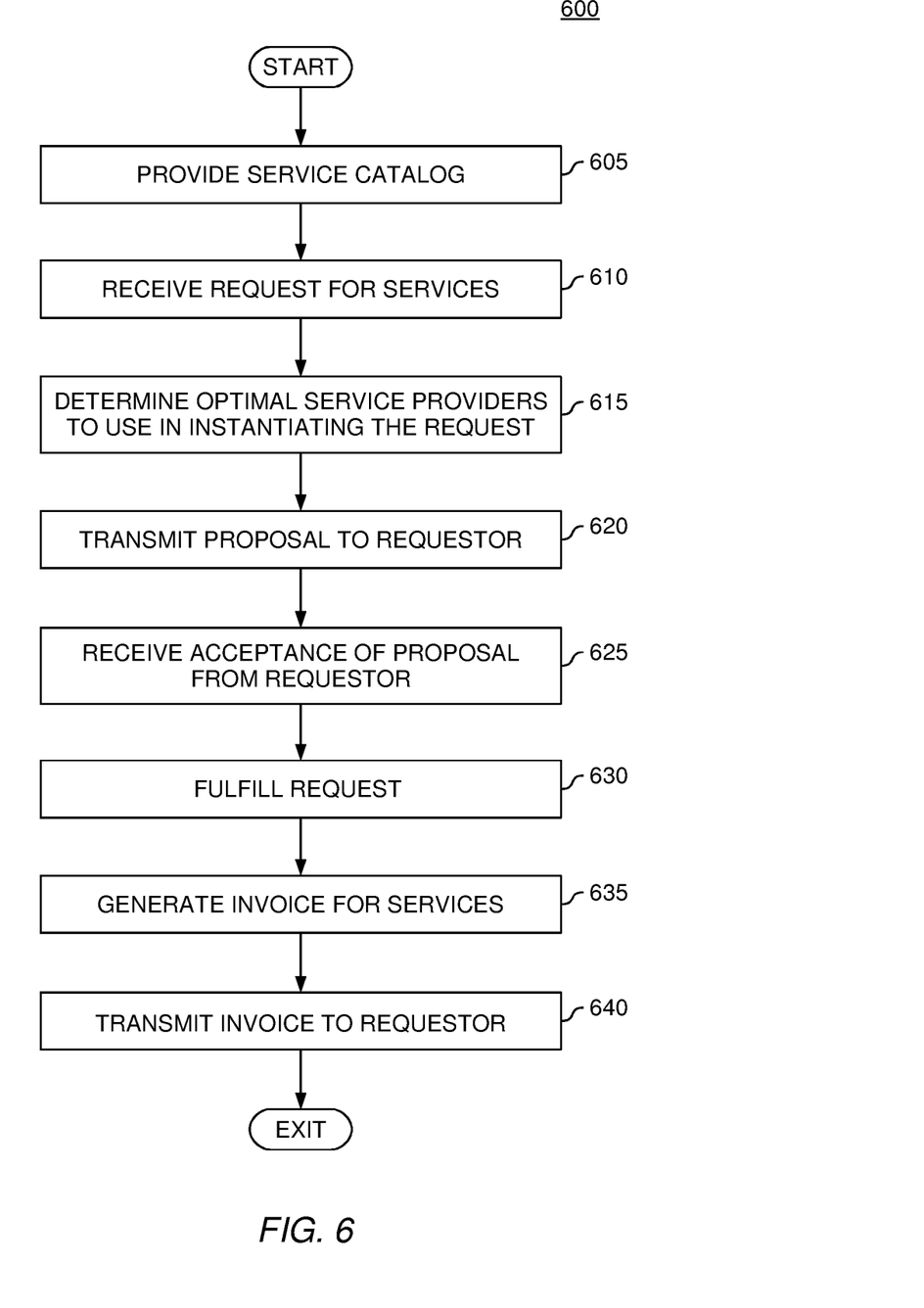
FIG. 6 is a flow diagram illustrating a method for fulfilling a service request, according to one embodiment presented in this disclosure.

FIG. 6 illustrates a method for fulfilling a service request, according to one embodiment presented in this disclosure. The method 600 begins at step 605, where the service broker component 120 provides a service catalog for use in processing service requests. As discussed above, the service catalog is generally a data store containing information on service providers and the services each service provider offers. Returning to the method 600, the service broker component 120 receives a request for services from a client (step 610) and determines one or more service providers to use in fulfilling the request (step 615). For instance, the service broker component 120 could use the method 500 shown in FIG. 5 and discussed above to determine which services providers to use in fulfilling the service request.

Once the service broker component 120 determines which service providers to use, the service broker component 120 transmits a proposal to the client for approval (step 620). Such a proposal may specify one or more service providers to be used in fulfilling the request, as well as data and metadata about the service providers and the services being provided. For instance, the proposal could contain pricing information specifying an amount each the service providers would charge for providing the requested services. Additionally, the proposal could specify quality information about each of the service providers, including a workload information, network and geographic proximity information, network quality information, and so on. In one embodiment, the service broker component 120 is configured to generate a plurality of proposals using different service providers and/or combinations of service providers. In such an embodiment, the service broker component 120 could transmit the plurality of proposals to the client and request that the client select one of the proposals for use in fulfilling the request.

The service broker component 120 then receives an acceptance of the proposal from the client (step 625). In an embodiment where the service broker component 120 generates a plurality of proposals for fulfilling the request, the acceptance could further specify a selection of one of the proposals to use in fulfilling the service request. Upon receiving the acceptance from the client, the service broker component 120 fulfills the request according to the proposal (step 630). That is, the service broker component 120 contacts each of the service providers included in the proposal and requests that each service provider provide the respective services for the client. In one embodiment, the service broker component 120 receiving the service request contacts a respective other service broker component 120 associated with each of the service providers to request the services be provided.

The service broker component 120 then generates an invoice for the provided services (step 635). Such an invoice may contain an itemized list of services that were provided to the client and pricing information for each of the provided services as well as a total amount for fulfilling the request. In one embodiment, the service broker component 120 may additionally charge the client (e.g., using previously entered billing information) the determined amount for fulfilling the request. In particular embodiments, the service broker component 120 does not fulfill the request using the determined service provider(s) until payment is received from the client. Once the invoice is generated, the service broker component 120 transmits the invoice to the client (step 640) and the method 600 ends.

Figure 7:
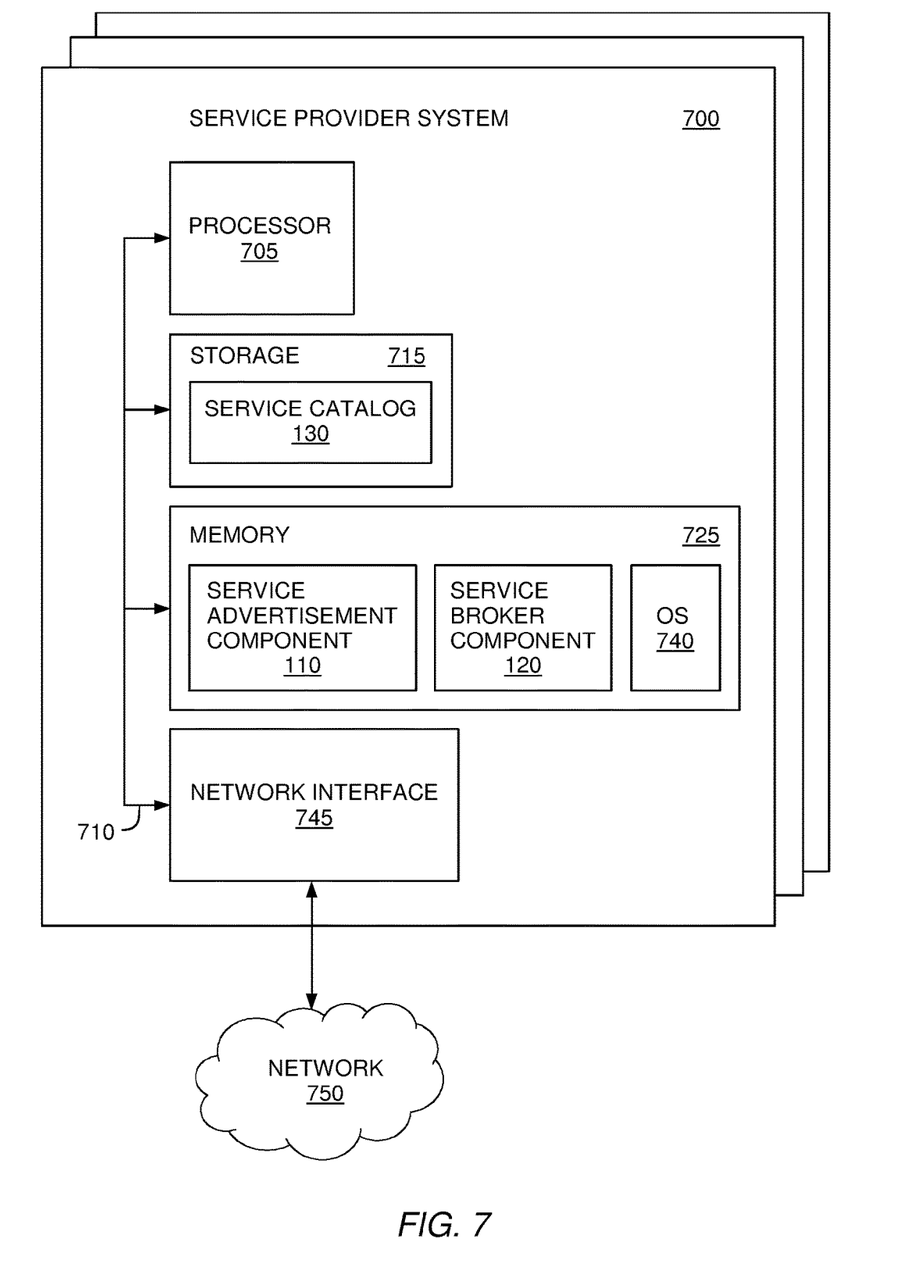
FIG. 7 is a block diagram illustrating a plurality of service provider systems, according to one embodiment presented in this disclosure.

FIG. 7 is a block diagram illustrating a plurality of service provider systems, according to one embodiment presented in this disclosure. As shown, a plurality of service provider systems 700 is interconnected via a network 750. In one embodiment, the service provider systems 700 may include existing computer systems, e.g., desktop computers, server computers, laptop computers, tablet computers and the like. The service provider system 700 illustrated in FIG. 7, however, is merely an example of a computer system in which embodiments may be used. Of course, embodiments may be implemented differently, regardless of whether the computer systems are complex multi-user computing systems, such as a cluster of individual computers connected by a high-speed network, single-user workstations or network appliances lacking non-volatile storage.

As shown, each service provider system 700 includes a processor 705, which obtains instructions and data via a bus 710 from a memory 725 and storage 715. Processor 705 is a programmable logic device that performs instruction, logic and mathematical processing, and may be representative of one or more CPUs. Storage 715 is representative of hard-disk drives, flash memory devices, optical media and the like. Generally, the storage 715 stores application programs and data for use by the service provider system 700. As shown, storage 715 contains a service catalog 130, which generally contains information on other service providers and the services they provide. The service provider system 700 is operably connected to the network 750 via the network interface 745.

The memory 725 is any memory sufficiently large to hold the necessary programs and data structures. Memory 725 could be one or a combination of memory devices, including Random Access Memory, nonvolatile or backup memory (e.g., programmable or Flash memories, read-only memories, etc.). In addition, memory 725 and storage 715 may be considered to include memory physically located elsewhere; for example, on another computer coupled to the service provider system 700 via bus 710. The memory 725 includes a service advertisement component 110, a service broker component 120 and an operating system (OS) 740. Operating system 740 is software used for managing the operation of the service provider system 700. Examples of OS 740 include UNIX, versions of the Microsoft Windows® operating system and distributions of the Linux® operating system. (Note: Linux is a trademark of Linus Torvalds in the United States and other countries.) Additionally, OS 740 may be an operating system specially developed for network devices, such as Cisco IOS®.

As discussed above, the service advertisement component 110 may transmit information regarding services provided by the service provider system 700 to service broker components running on other service provider systems. The service broker component 120 is generally configured to receive information from other service provider systems regarding the services the other service providers offer. The service broker component 120 may use this information to maintain the service catalog 130. Furthermore, the service broker component 120 is configured to receive a service request, identify service providers to use in fulfilling the service request and to fulfill the request using the identified service providers.

Additionally, it is specifically contemplated that particular embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the service broker component 120) or related data available in the cloud. For example, the service broker component 120 could execute on a computing system in the cloud and receive advertisements of service offerings from a number of service provider systems configured to run a service advertisement component 110. In such a case, the service broker component 120 could process service requests from clients using one or more services offered by the service providers, based on the received advertisements of service offerings. Doing so allows users to submit service requests from any computing system attached to a network connected to the cloud (e.g., the Internet).

As will be appreciated by one skilled in the art, embodiments presented in this disclosure may be implemented as a system, method or computer program product. Accordingly, embodiments presented herein may be implemented as an entirely hardware embodiment, as an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments may be devised without departing from the basic scope thereof. In view of the foregoing, the scope of the present disclosure is determined by the claims that follow.

We claim:

1. A method for dynamically peering with one or more service providers to fulfill a request for services, comprising:
receiving, by a first service provider, a tagged advertisement of offered services from each of a plurality of service providers, wherein each tagged advertisement specifies at least one service offered by the respective service provider and pricing information for each of the offered services;
receiving, by the first service provider, a request from a client specifying one or more services to be provided for a network connection between a first site and a second site;
determining, by operation of one or more computer processors, a second service provider, from the plurality, to peer with in order to fulfill the request, based on the received tagged advertisements of offered services and the one or more services specified in the request;
determining a route for establishing the network connection between the first site and the second site, wherein the route comprises a path through the network that begins at the first site and ends at the second site, and wherein the path is determined to include both the first service provider and the second service provider offering the requested services;
peering with at least the second service provider to dynamically create a peered federation to fulfill the request; and
establishing the network connection between a first network device of the first site and a second network device of the second site using the determined route that includes both the first service provider and the second service provider, wherein the requested services are provided for the network connection through the peered federation.

2. The method of claim 1, further comprising:
storing a reference to each offered service in a service catalog at the first service provider; and
responsive to receiving an updated advertisement of offered services from one of the plurality of service providers, updating the service catalog based on the updated advertisement of offered services.

3. The method of claim 1, wherein the tagged advertisement of offered services contains one or more tags, each of the tags specifying one of a list of offered services, a geographical location where the offered services are hosted, a network location where the offered services are hosted, metadata describing characteristics of the offered services, or metadata describing characteristics of the service provider.

4. The method of claim 1, further comprising:
generating a proposal specifying the created peered federation including at least the first service provider and the second service provider for use in fulfilling the request; and
transmitting the proposal to the client, wherein peering the first service provider with at least the second service provider is performed responsive to receiving an acceptance of the proposal from the client, and wherein peering the first service provider with at least the second service provider is further based on the accepted proposal.

5. The method of claim 4, wherein the proposal further specifies i) a first service to be provided through the peered federation and ii) pricing information for providing the first service.

6. The method of claim 1, further comprising:
calculating a total price for fulfilling the request; and
for each service provider in the peered federation, determining a portion of the calculated total price to be allocated to the service provider, based on the pricing information in the tagged advertisement of offered services received from the service provider and services the service provider is providing to the peered federation to fulfill the request.

7. The method of claim 1, further comprising:
transmitting a second tagged advertisement of offered services from the first service provider to each of the plurality of service providers wherein the second tagged advertisement specifies at least one or more services offered by the first service provider and pricing information for each of the offered services.

8. The method of claim 1, wherein determining a second service provider from the plurality of service providers to peer with in order to fulfill the request further comprises:
generating a plurality of proposals for use in fulfilling the request, wherein each proposal specifies a respective one or more service providers for use in fulfilling the request, wherein each of the one or more service providers provides at least one service specified in the request;

transmitting the plurality of proposals to the client; and
receiving a selection of one of the plurality of proposals from the client,
and
wherein peering the first service provider with at least the second service provider is further based on the selected proposal.

9. A computer program product for dynamically peering with one or more service providers to fulfill a request for services, comprising:
   computer code that receives, at a first service provider, a tagged advertisement of offered services from each of a plurality of service providers, wherein each tagged advertisement specifies at least one service offered by the respective service provider and pricing information for each of the offered services;
   computer code that receives, at the first service provider, a request from a client specifying one or more services to be provided for a network connection between a first site and a second site;
   computer code that determines a second service provider, from the plurality, to peer with in order to fulfill the request, based on the received tagged advertisements of offered services and the one or more services specified in the request;
   computer code that determines a route for establishing the network connection between the first site and the second site, wherein the route comprises a path through the network that begins at the first site and ends at the second site, and wherein the path is determined to include both the first service provider and the second service provider offering the requested services;
   computer code that peers with at least the second service provider to dynamically create a peered federation to fulfill the request;
   computer code that establishes the network connection between a first network device of the first site and a second network device of the second site using the determined route that includes both the first service provider and the second service provider, wherein the requested services are provided for the network connection through the peered federation; and
   a computer-readable medium that stores the computer codes.

10. The computer program product of claim 9, further comprising:
    computer code that stores a reference to each offered service in a service catalog at the first service provider; and
    computer code that, responsive to receiving an updated advertisement of offered services from one of the plurality of service providers, updates the service catalog based on the updated advertisement of offered services.

11. The computer program product of claim 9, wherein the tagged advertisement of offered services contains one or more tags, each of the tags specifying one of a list of offered services, a geographical location where the offered services are hosted, a network location where the offered services are hosted, metadata describing characteristics of the offered services, or metadata describing characteristics of the service provider.

12. The computer program product of claim 9, further comprising:
    computer code that generates a proposal specifying the created peered federation including at least the first service provider and the second service provider for use in fulfilling the request; and
    computer code that transmits the proposal to the client, wherein peering the first service provider with at least the second service provider is performed responsive to receiving an acceptance of the proposal from the client, and wherein peering the first service provider with at least the second service provider is further based on the accepted proposal.

13. The computer program product of claim 12, wherein the proposal further specifies i) a first service to be provided through the peered federation and ii) pricing information for providing the first service.

14. The computer program product of claim 9, further comprising:
    computer code that calculates a total price for fulfilling the request; and
    computer code that, for each service provider in the peered federation, determines a portion of the calculated total price to be allocated to the service provider, based on the pricing information in the tagged advertisement of offered services received from the service provider and services the service provider is providing to the peered federation to fulfill the request.

15. The computer program product of claim 9, further comprising:
    computer code that transmits a second tagged advertisement of offered services from the first service provider to each of the plurality of service providers wherein the second tagged advertisement specifies at least one or more services offered by the first service provider and pricing information for each of the offered services.

16. The computer program product of claim 9, wherein determining a second service provider from the plurality of service providers to peer with in order to fulfill the request further comprises:
    computer code that generates a plurality of proposals for use in fulfilling the request, wherein each proposal specifies a respective one or more service providers for use in fulfilling the request, wherein each of the one or more service providers provides at least one service specified in the request;
    computer code that transmits the plurality of proposals to the client; and
    computer code that receives a selection of one of the plurality of proposals from the client,
    and
    wherein the computer code that peers the first service provider with at least the second service provider does so further based on the selected proposal.

17. A system, comprising:
    a processor; and
    a memory to store executable code, which, when executed on the processor, performs a method for dynamically peering with one or more service providers to fulfill a request for services, comprising:
       receiving, by a first service provider, a tagged advertisement of offered services from each of a plurality of service providers, wherein each tagged advertisement specifies at least one service offered by the respective service provider and pricing information for each of the offered services;
       receiving, by the first service provider, a request from a client specifying one or more services to be provided for a network connection between a first site and a second site;

determining a second service provider, from the plurality, to peer with in order to fulfill the request, based on the received tagged advertisements of offered services and the one or more services specified in the request;

determining a route for establishing the network connection between the first site and the second site, wherein the route comprises a path through the network that begins at the first site and ends at the second site, and wherein the path is determined to include both the first service provider and the second service provider offering the requested services;

peering with at least the second service provider to dynamically create a peered federation to fulfill the request; and establishing the network connection between a first network device of the first site and a second network device of the second site using the determined route that includes both the first service provider and the second service provider, wherein the requested services are provided for the network connection through the peered federation.

18. The system of claim 17, the method further comprising:

storing a reference to each offered service in a service catalog at the first service provider; and responsive to receiving an updated advertisement of offered services from one of the plurality of service providers, updating the service catalog based on the updated advertisement of offered services.

19. The system of claim 17, wherein the tagged advertisement of offered services contains one or more tags, each of the tags specifying one of a list of offered services, a geographical location where the offered services are hosted, a network location where the offered services are hosted, metadata describing characteristics of the offered services, or metadata describing characteristics of the service provider.

20. The system of claim 17, the method further comprising:

generating a proposal specifying the created peered federation including at least the first service provider and the second service provider for use in fulfilling the request; and transmitting the proposal to the client, wherein peering the first service provider with at least the second service provider is performed responsive to receiving an acceptance of the proposal from the client, and wherein peering the first service provider with at least the second service provider is further based on the accepted proposal.

21. The system of claim 20, wherein the proposal further specifies i) a first service to be provided through the peered federation and ii) pricing information for providing the first service.

22. The system of claim 17, the method further comprising:

calculating a total price for fulfilling the request; and for each service provider in the peered federation, determining a portion of the calculated total price to be allocated to the service provider, based on the pricing information in the tagged advertisement of offered services received from the service provider and services the service provider is providing to the peered federation to fulfill the request.

23. The system of claim 17, the method further comprising:

transmitting a second tagged advertisement of offered services from the first service provider to each of the plurality of service providers wherein the second tagged advertisement specifies at least one or more services offered by the first service provider and pricing information for each of the offered services.

24. The system of claim 17, wherein determining a second service provider from the plurality of service providers to peer with in order to fulfill the request further comprises:

generating a plurality of proposals for use in fulfilling the request, wherein each proposal specifies a respective one or more service providers for use in fulfilling the request, wherein each of the one or more service providers provides at least one service specified in the request;

transmitting the plurality of proposals to the client; and receiving a selection of one of the plurality of proposals from the client, and wherein peering the first service provider with at least the second service provider is further based on the selected proposal.

* * * * *